(12) United States Patent
Beall et al.

(10) Patent No.: US 8,814,974 B2
(45) Date of Patent: Aug. 26, 2014

(54) THIN-WALLED POROUS CERAMIC WALL-FLOW FILTER

(75) Inventors: Douglas Munroe Beall, Painted Post, NY (US); Achim Karl-Erich Heibel, Corning, NY (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 257 days.

(21) Appl. No.: 11/895,312

(22) Filed: Aug. 24, 2007

(65) Prior Publication Data

US 2009/0049815 A1   Feb. 26, 2009

(51) Int. Cl.
| | | |
|---|---|---|
| B01D 39/20 | (2006.01) | |
| B01D 39/14 | (2006.01) | |
| B01D 39/06 | (2006.01) | |
| B01D 24/00 | (2006.01) | |
| B01D 50/00 | (2006.01) | |
| B01J 23/00 | (2006.01) | |
| B01J 23/10 | (2006.01) | |

(52) U.S. Cl.
USPC .......... 55/523; 55/522; 55/524; 422/177; 422/178; 422/179; 422/180; 422/181; 422/182; 502/303

(58) Field of Classification Search
USPC .......... 55/522–524; 422/177–182; 502/303
See application file for complete search history.

(56) References Cited

U.S. PATENT DOCUMENTS

| | | | |
|---|---|---|---|
| 4,329,162 A | 5/1982 | Pitcher, Jr. ............... | 55/523 |
| RE31,405 E | 10/1983 | Paisley ..................... | 501/84 |
| 4,416,676 A | 11/1983 | Montierth ................. | 55/523 |
| 4,420,316 A | 12/1983 | Frost et al. ............... | 55/523 |
| 4,455,180 A | 6/1984 | Hillman et al. ........... | 156/89 |
| 4,557,773 A | 12/1985 | Bonzo ...................... | 156/64 |
| 4,667,469 A * | 5/1987 | Abthoff et al. ........... | 60/311 |
| 5,260,035 A * | 11/1993 | Lachman et al. ......... | 422/180 |

(Continued)

FOREIGN PATENT DOCUMENTS

| | | |
|---|---|---|
| EP | 1 568 406 | 8/2005 |
| EP | 1 596 045 | 11/2005 |

(Continued)

OTHER PUBLICATIONS

G.A. Merkel, et al., "Effects of Microstructure and Cell Geometry on Performance of Cordierite Diesel Particulate Filters", Mar. 2001, SAE Technical Paper Series 2001-01-0193.

(Continued)

*Primary Examiner* — Amber Orlando
(74) *Attorney, Agent, or Firm* — Matthew B. McNutt

(57) ABSTRACT

A thin-walled porous ceramic wall-flow filter is disclosed. The filter produces a relatively lower pressure drop coupled with relatively high initial filtration efficiency (FE0), and may enable packaging the filter in a smaller volume. The filter includes a plurality of porous ceramic walls forming cell channels. At least some of the cells are plugged forcing some exhaust gases through the walls, thereby filtering out entrained particulates. The walls have a wall thickness ($T_{wall}$) wherein 102 µm≤$T_{wall}$<279 µm, and a median pore diameter (MPD), and wherein 10<$T_{wall}$/MPD, and may also be <40. The relatively small median pore diameter (MPD) in comparison to the wall thickness ($T_{wall}$) allows the use of thinner ceramic walls that provide less flow resistance than thicker walls while maintaining sufficient initial filtration efficiency (FE0). Furthermore, such thin-walled filter structure coupled with unequal inlet/outlet area ratio (Ai/Ao) may allow filter lengths to be additionally shortened.

11 Claims, 6 Drawing Sheets

(56) References Cited

U.S. PATENT DOCUMENTS

| | | | |
|---|---|---|---|
| 5,914,187 A | 6/1999 | Naruse et al. ............... 428/327 |
| 6,206,944 B1 | 3/2001 | Hickman ...................... 55/523 |
| 6,800,108 B2* | 10/2004 | Noda ............................ 55/523 |
| 6,815,038 B2* | 11/2004 | Morimoto et al. ........... 428/116 |
| RE38,888 E | 11/2005 | Beall et al. .................. 501/119 |
| 7,141,089 B2 | 11/2006 | Beall et al. .................... 55/523 |
| 7,247,184 B2 | 7/2007 | Frost ............................. 55/523 |
| 7,520,911 B2* | 4/2009 | Beall et al. .................... 55/523 |
| 2003/0024219 A1 | 2/2003 | Harada et al. |
| 2003/0029147 A1 | 2/2003 | Noda |
| 2003/0053940 A1* | 3/2003 | Harada et al. ................ 422/180 |
| 2004/0112024 A1* | 6/2004 | Noguchi et al. ............... 55/523 |
| 2004/0148916 A1 | 8/2004 | Merkel |
| 2004/0261384 A1 | 12/2004 | Merkel et al. ................. 55/523 |
| 2005/0066639 A1 | 3/2005 | Frost ............................. 55/523 |
| 2005/0069469 A1* | 3/2005 | Fu et al. ....................... 422/177 |
| 2006/0131782 A1 | 6/2006 | Mudd et al. .................. 264/259 |
| 2006/0159602 A1* | 7/2006 | Ohno et al. ................... 422/211 |
| 2007/0119133 A1 | 5/2007 | Beall et al. .................... 55/523 |
| 2007/0119135 A1 | 5/2007 | Miao et al. .................... 55/523 |
| 2007/0163117 A1 | 7/2007 | Nishimura et al. ............ 29/890 |
| 2007/0166564 A1 | 7/2007 | Morimoto et al. ........... 428/593 |

FOREIGN PATENT DOCUMENTS

| | | | |
|---|---|---|---|
| JP | 2001269522 | 10/2001 | |
| JP | 2001269585 | 10/2001 | |
| JP | 2006516528 | 7/2006 | |
| WO | 03/020407 | 3/2003 | |
| WO | WO2005/051859 | 6/2005 | ............. C04B 12/04 |

OTHER PUBLICATIONS

Daniel Ricoult, "Materials Engineering and New Designs for Robust Cordierite Diesel Particulate Filters", SAE Paper No. 2005-26-024.

Anthony Briot, et al., "Minimizing Filter Volume by Design Optimization", Apr. 2007, SAE Technical Paper Series 2007-01-0657.

* cited by examiner

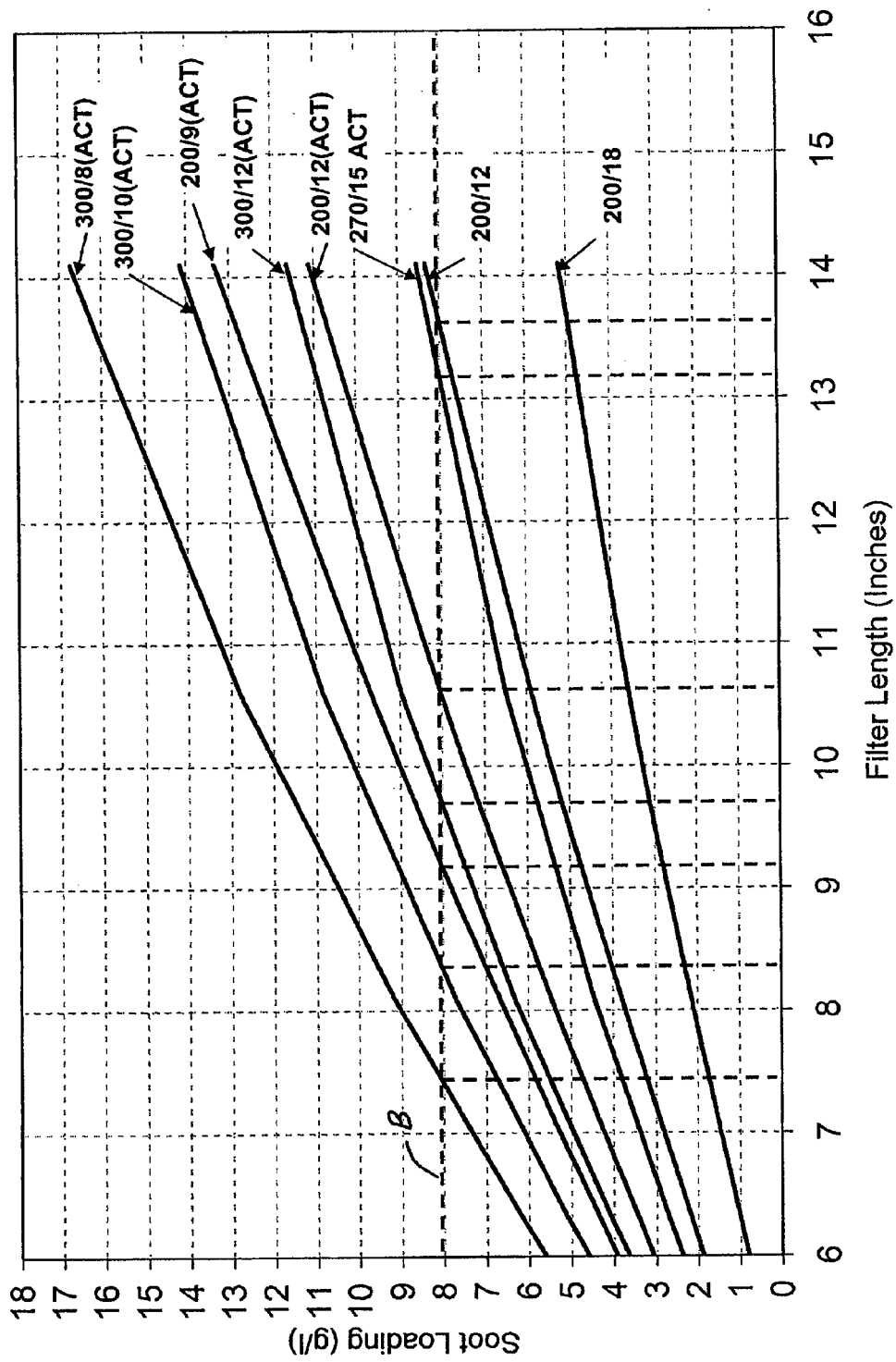

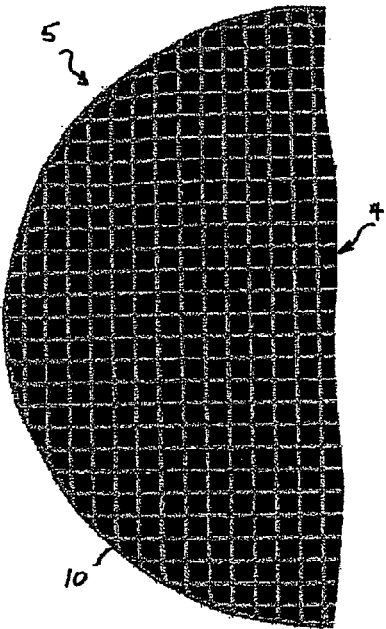
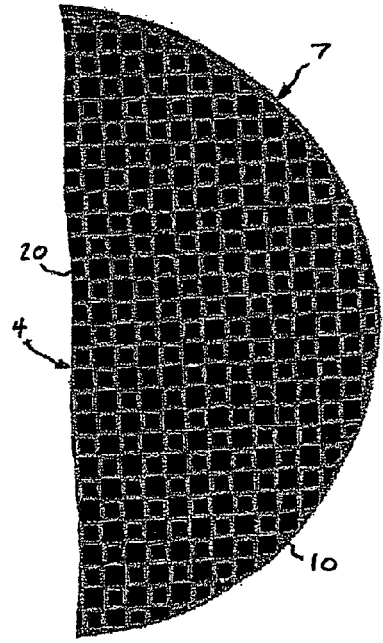
FIGURE 7A  FIGURE 7B
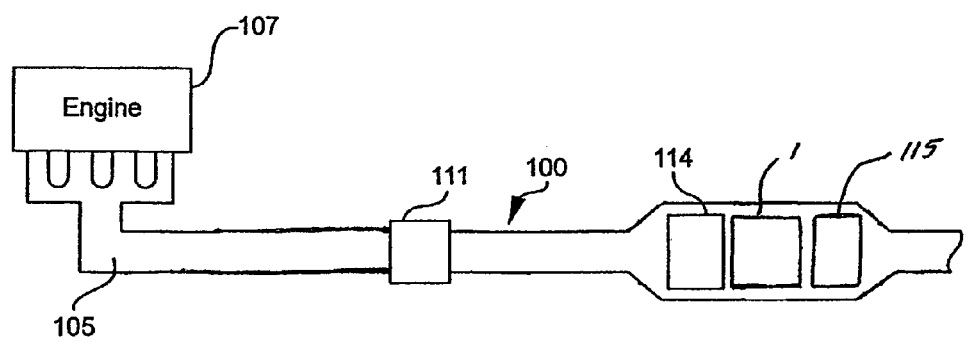
FIGURE 8

THIN-WALLED POROUS CERAMIC WALL-FLOW FILTER

FIELD OF THE INVENTION

This invention relates to porous ceramic wall-flow filters, and is specifically concerned with thin-walled porous ceramic wall-flow filters.

BACKGROUND OF THE INVENTION

Diesel particulate filters are known in the prior art; examples of which are described in U.S. Pat. Nos. 4,329,162; 4,420,316; 4,416,676; and 6,206,944. Such diesel particulate filters (otherwise referred to as wall-flow filters, diesel particulate traps, honeycomb filters, or exhaust filters) to date have been produced which include a network of porous ceramic walls with a wall thickness of 12-30 mils (305-762 µm) that filter out soot particles from a flow of diesel exhaust. The porous ceramic walls are integrally interconnected to form a matrix of gas-conducting cell channels which typically have a cross sectional shape of square, circular, rectangular, triangular, octagonal, hexagonal, or combinations thereof, for example. The outer region of the matrix of ceramic cell channels may be surrounded by a skin to form a single, unitary structure, which may be cylindrical in shape, for example, but may include any cross sectional shape required for the application.

Such diesel particulate wall-flow filters have an inlet end for receiving exhaust gases, and an outlet end for expelling these gases after being filtered. The cell channels are defined by a plurality of porous ceramic walls which are generally elongated and extend between the inlet and outlet ends. The porous ceramic walls are arranged and configured to typically define a honeycomb structure having a cell density (CD) of between about 10 and 400 cells per square inch (cpsi). The cells defined by the plurality of gas-conducting cells may be plugged at each end in a "checkerboard" pattern, for example; with all inlet channels being plugged at the outlet end, and all outlet channels being plugged at the inlet end. Such plugging of the structure forces the diesel exhaust gases to flow through the porous ceramic walls, thereby filtering out the soot particles generated within the exhaust of diesel engines, hence the term "wall-flow."

In operation, soot particles in the exhaust gas are trapped on the walls of the inlet channel or in the pores of the wall. As soot particles accumulate on the gas inlet-side of the ceramic walls forming the cells, the pressure drop across (soot loaded back pressure) the filter increases. In some applications, the pressure drop of the filter becomes unacceptably high due to soot accumulation, and the filter must be thermally regenerated. Hence, typically the cells are periodically exposed to conditions initiating a "burnout cycle" designed to ablate the accumulated particles of soot and convert them to ash. Upon completion of the thermal regeneration cycle, the filter is restored again to a generally low back pressure level. Other applications may include a significant amount of passive regeneration such that the soot is, in operation, continuously converted to ash. In either case, management of ash is an important consideration.

For practical applications, a goal for filters is to achieve certain important performance criteria. Among the most important are relatively low pressure drop and relatively high filtration efficiency. Additionally, achieving relatively high strength, and thermal and mechanical durability are also important considerations. Thermal durability, for example, is important since the centrally located ceramic walls of the matrix of a diesel particulate filter may be raised to a very high temperatures (in excess of 800° C.) during the burn out cycles, while the outer skin may only be heated to much lower temperatures. The resulting differential temperature between the matrix core and the skin (sometimes 500+° C.) may create a substantial thermal gradient in the filter. These gradients may create thermal stresses in the particulate filter that may be detrimental. Mechanical durability is also desirable, because filters are subjected to mechanical stresses during manufacture and installation, as well as to applied pressures to the ceramic walls during filter operation. Low pressure drop is desirable to minimize interference with the efficient expulsion of exhaust gases so as to cause a power reduction in the engine. Moreover, in certain applications, it is desirable that the initial filtration efficiency (FE0) be relatively higher to achieve sufficient initial removal of particulate matter from the exhaust gas. This is particularly desirable in filters, which, in operation, undergo a large percentage of passive regeneration. Filters achieving these combinations have proven very elusive. And, although current commercial filters provide an acceptable combination of performance, they have not achieved the superior combinations of properties identified above.

One simple approach to lowering the pressure drop that a filter of a given volume exerts on the exhaust system may be to reduce the thickness of the ceramic walls forming the cells. Such thinner walls would exhibit lower resistance to the flow of exhaust gases passing through the ceramic walls. However, according to previous teachings in the ceramic filter arts, any pressure drop advantage obtained by providing a diesel particulate filter with ceramic walls thinner 12.0 mils would be more than outweighed by the combined disadvantages of lowered mechanical strength, and lowered initial filtration efficiency. Additionally, such thinner walls may also have lowered bulk heat capacity which may result in high temperatures and high thermal gradients during burn out cycles, as well as a propensity for a higher frequency of fuel-expending burn out cycles to ablate the accumulated soot (in active regeneration scenarios) in order to maintain an acceptably low operating pressure drop. This may be especially true in cordierite ceramic materials.

Accordingly, wall-flow filters capable of maintaining a relatively high initial filtration efficiency and relatively low pressure drop have proven elusive. Additionally, achieving such combined attributes of relatively high initial filtration efficiency and relatively low pressure drop, while coupled with also exhibiting sufficient mechanical strength and/or sufficient bulk heat capacity, have, of course, proven even more elusive.

SUMMARY OF THE INVENTION

Generally speaking, the invention is a porous ceramic, wall-flow filter. Such a filter is, for example, particularly useful as a particulate filter, and may be used in engine exhaust filtration applications, such as for diesel exhaust filtration. One excellent advantage which may be achieved by the present invention is it may allow for packaging of the porous ceramic wall-flow filter within a much smaller volume, as compared to former filter designs. This is especially important for exhaust after-treatment system upgrades (retrofit applications). For example, upgraded systems may require NOx treatment in addition to particulate soot filtration. In such upgrades, generally, additional ceramic substrate components may be needed to be housed within the same or similar space envelope in order to address NOx remediation. Accordingly, in one broad advantage, the present invention may allow significantly smaller filters (in volume or in length). As such, the present invention may allow additional space envelope for such additional aftertreatment components. Furthermore, the present invention, in accordance with another broad advantage, may allow combinations of initial filtration efficiency (FE0) and clean back pressure drop (ΔPc) which heretofore were unachievable.

Therefore, according to embodiments of the invention, a ceramic wall-flow filter is provided comprising a plurality of porous ceramic walls forming cell channels, at least some of the channels including plugs, wherein the walls have a thickness ($T_{wall}$) greater than or equal to 102 mils (≥279 μm) and less than 11.0 mils (<279 μm), and the porous walls exhibit a median pore diameter (MPD), and a ratio (WP) defined as WP=$T_{wall}$/MPD is provided such that WP>10. In order to ensure sufficiently low back pressure, the ratio $T_{wall}$/MPD may also be less than 40, less than 35, less than 30, less than 25, or even less than 20. The relatively small MPD relative to the wall thickness ($T_{wall}$) allows the use of thinner ceramic walls, and provides less flow resistance than thicker walls while unexpectedly maintaining the same initial filtration efficiency (FE0). In particular, initial filtration efficiency (FE0) of greater than 30%, greater than 35%, greater than 40%, greater than 50%, or even greater than 60%, may be achieved by the present invention. In some embodiments, initial filtration efficiency (FE0) of greater than 70%, greater than 80%, or even greater than 90%, may be achieved. Thinner walls also increase the cross sectional area of the gas-conducting cells, further decreasing flow resistance. Moreover, the thinner walls allow for a greater build up of soot before ablative soot removal is required. This advantageously decreases the frequency of fuel-expending burn-out cycles (in the case of active regeneration). Combining this aspect of the invention with an additional feature of including larger average cross sectional area of the inlet channels than outlet channels allows further additional reduction in the overall size (length and/or volume) of the filter.

In more detail, and in accordance with embodiments of the invention, the filter may include an inlet end and an outlet end, and the network of porous ceramic walls which define a plurality of gas-conducting cells. The cells may have, for example, a cell density (CD) of between about 100 and 400 cpsi, or even 150 cpsi and 300 cpsi. Each of the cell channels is generally designed as an inlet or an outlet cell channel, and at least some of the cell channels are plugged so that a flow of gas entering the unplugged inlet ends of the cell channels (the inlet channels) is forced through at least some of the porous ceramic walls before exiting the unplugged outlet ends (outlet channels). The cells that are plugged may be plugged in a repeating pattern, such as a checkerboard pattern.

The mechanical strength of the ceramic walls of the filter may be 150 psi or greater, as measured by a modulus of rupture on a four point bend test on a 1"×½"×4½" sample cellular substrate. Optionally, the strength may be characterized by the normalized strength (NS) which is defined herein as NS=MOR/CFAR, wherein CFAR is the closed frontal area ratio. Embodiments of the invention have exhibited NS of 1000 psi or more, NS of 1100 psi or more, NS of 1500 psi or more, or even 2000 psi or more. According to further embodiments, the ceramic walls may be formed, for example, from one of the group consisting of cordierite and aluminum titanate. However, they may optionally be manufactured from any other suitable ceramic material such as SiC. The total porosity (% P) of the walls may be % P≥30%, % P≥40%, 30%≤% P≤80%, 35%≤% P≤75%, or even 40%≤% P≤60%, by volume. Particularly advantageous combination ranges may be 102 μm≤$T_{wall}$<152 μm with 10<WP<30; 152 μm≤$T_{wall}$<229 μm with 12<WP<36; and 229 μm≤$T_{wall}$<279 μm with 15<WP<42.

According to additional embodiments, the invention is a ceramic diesel particulate wall-flow filter, comprising a plurality of porous ceramic walls defining cell channels, at least some of the channels being plugged, the filter exhibiting $$102\ \mu m \le T_{wall} \le 279\ \mu m,$$

$$4\ \mu m \le MPD \le 18\ \mu m,$$

$$35\% \le \%P \le 65\%, \text{ and}$$

$$10 < (T_{wall}/MPD) < 35$$

wherein $T_{wall}$ is a thickness of the walls in μm, MPD is a median pore diameter of the pores in the walls in μm, and %P is a total porosity of the walls by volume.

According to yet further embodiments, and in another broad aspect, the invention is a ceramic diesel particulate wall-flow filter, comprising a plurality of porous ceramic walls defining cell channels, at least some of the channels being plugged, the filter exhibiting $$178\ \mu m \le T_{wall} \le 279\ \mu m,$$

$$4\ \mu m \le MPD \le 18\ \mu m,$$

$$35\% \le \%P \le 75\%,$$

$$10 < (T_{wall}/MPD) < 35,$$

$$Ai/Ao > 1.2, \text{ and}$$

$$150\ cpsi < CD < 300\ cpsi$$

wherein $T_{wall}$ is a thickness of the walls in μm, MPD is a median pore diameter of the pores in the walls in μm, %P is a total porosity of the walls by volume, Ai is a cross sectional area of the inlets cells, Ao is a cross sectional area of the outlet cells (Ao), and CD is the cell density in cpsi.

DESCRIPTION OF THE DRAWINGS

FIG. 6 is a graph illustrating filter length (in inches) as a function of soot loading (in g/L) for filters having various combinations of cell densities and wall thicknesses.

FIGS. 7A and 7B are photographs of half sections of the cell configuration of a standard wall particulate filter, and a particulate filter employing Asymmetric Cell Technology (ACT) in combination with the present invention.

FIG. 8 is a pictorial diagram illustrating a system environment including the thin-walled wall-flow filter of the present invention.

DETAILED DESCRIPTION OF THE EMBODIMENTS

Figure 1:
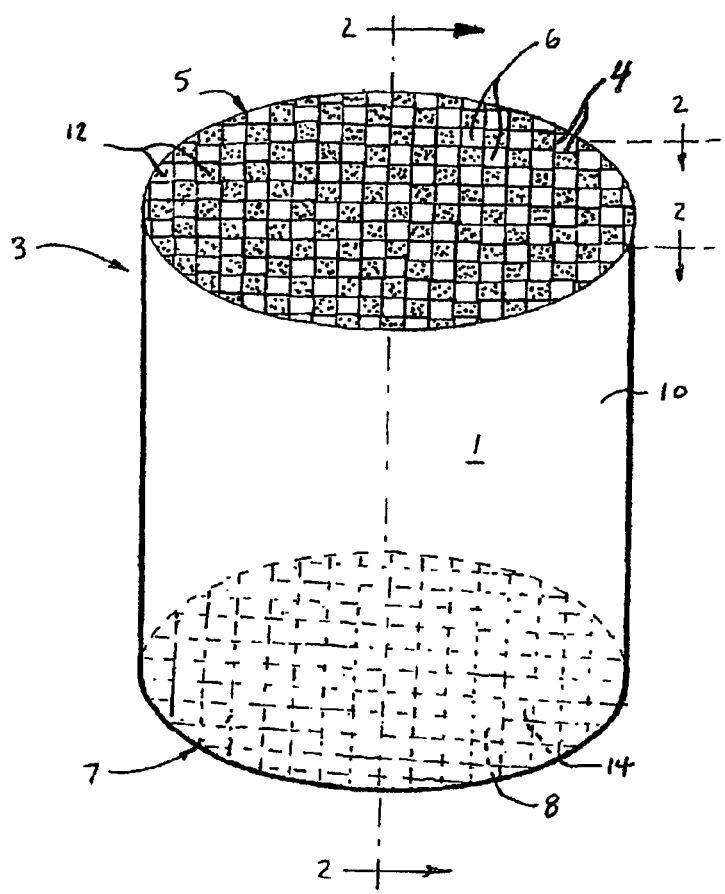
FIG. 1 is a perspective view of a ceramic wall-flow filter including the present invention.
Figure 2:
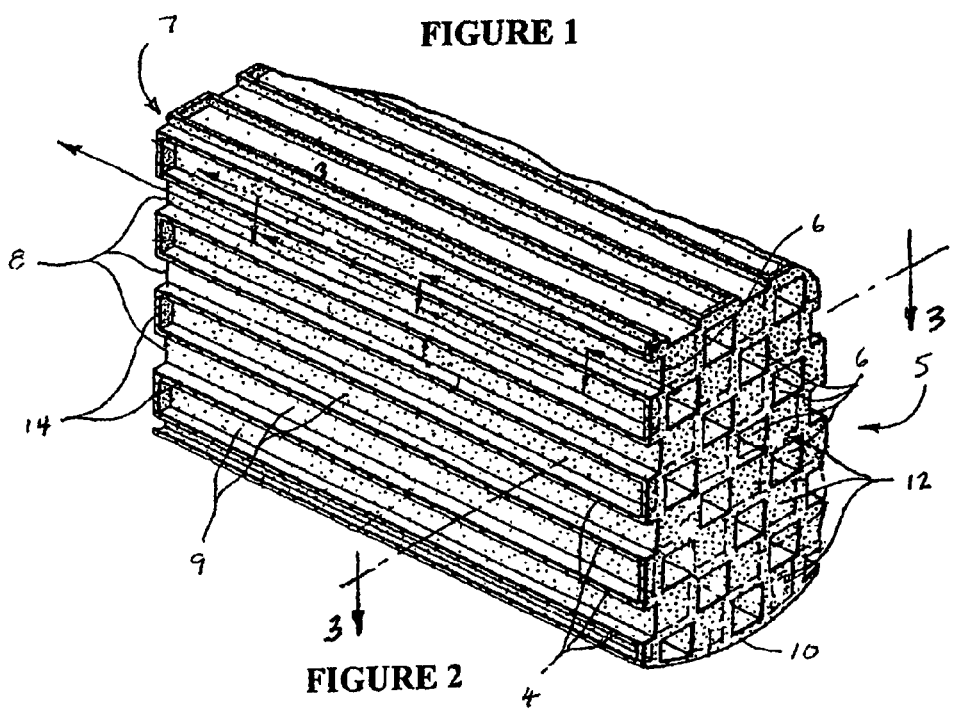
FIG. 2 is a perspective view of a partial section of the filter illustrated in FIG. 1 along the section lines 2-2.
Figure 3:
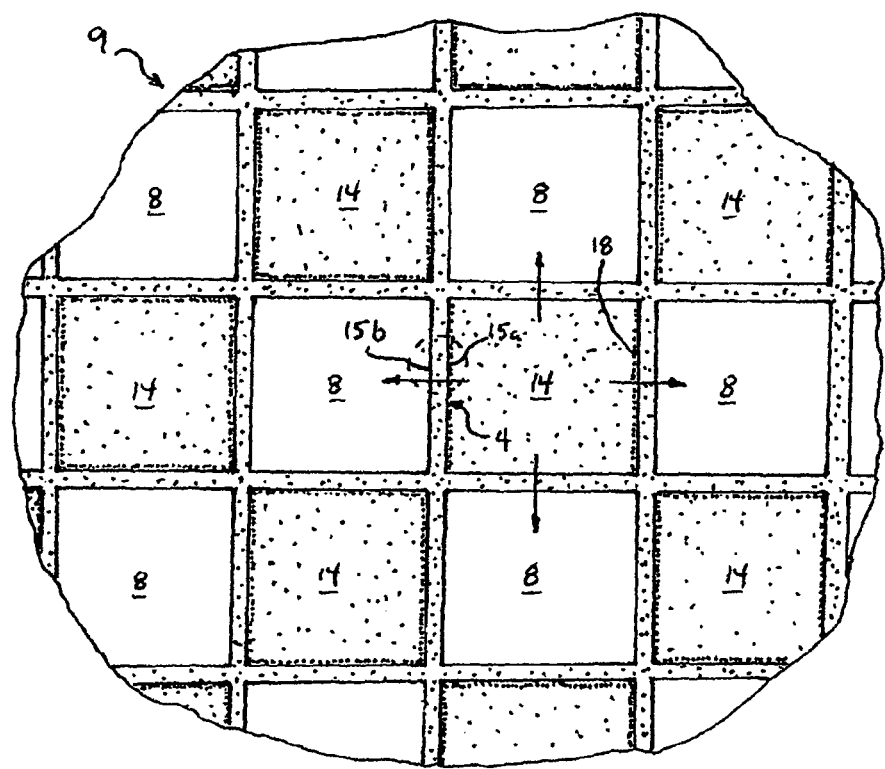
FIG. 3 is an enlarged partial cross sectional view of the exhaust filter illustrated in FIG. 2 along the section lines 3-3.

With reference now to FIGS. 1 and 2, wherein like numerals designate like components throughout all the several figures, the invention, according to embodiments thereof, is a particulate filter 1 of the type having a ceramic body 3. Body 3 may be formed from a ceramic material such as cordierite, aluminum titanate, SiC, or the like. The present invention solves a significant problem of enabling the use a smaller space envelope to house filters when using such cordierite, aluminum titanate, SiC, and like materials. Ceramic body 3 contains a plurality of interconnected porous ceramic walls 4, and has an inlet end 5 having a plurality of exhaust gas inlet channels 6 (otherwise referred to as "inlet cells"), and an outlet end 7 with a plurality of exhaust gas outlet channels 8 (otherwise "outlet cells"). The porous ceramic walls 4 at least partially define a plurality of gas-conducting cell channels 9 (FIG. 2) disposed between the inlet end 5 and outlet end 7. While the cells 9 illustrated in FIGS. 1-3 are shown as square in cross-section, other shapes, such as octagons, hexagons, rectangles, circles, triangles, and combinations thereof may be used as well. An outer skin 10 may circumscribe the cells 9 and may be formed in the extrusion process or otherwise applied thereafter.

With particular reference to FIG. 2, at least some of the cell channels are plugged, such as with a plugging cement, such as at the end of the cell channel. The inlet 5 and outlet 7 ends of the cell channels 9 may be, for example, plugged in a checkerboard pattern via inlet plugs 12 and outlet plugs 14 integrally formed from a ceramic material similar to that forming the interior walls 4. Any suitable ceramic plugging cement may be employed with the invention, such as the foam-type cordierite ceramic cement described in U.S. Pat. No. Re. 31,405, the cement described in U.S. Pat. Nos. 5,914,187 or 4,455,180, or the cement described in WO 2005/051859, for example. Suitable plugging processes are described in U.S. Pat. No. 4,557,773 and US Patent App. No. 2006/0131782, for example. The filter 1 of the invention may be included, as best shown in FIG. 8, in an exhaust system 100 for removing particulates from the exhaust of an engine 107, such as a diesel engine, for example. The exhaust system 100 generally may include a conduit 105 leading from the engine 107 to the ceramic wall-flow filter 1, and may further include a diesel oxidation catalyst 114 upstream of the filter and if Nox removal is desired, an SCR component 115 downstream thereof. Moreover, the system may include a turbocharger 111, in some cases. The present invention is useful in reducing the overall length (or volume) of systems including multiple components, and in particular, after treatment systems including combinations of DOCs, wall-flow filters, and SCR (Nox removal) components.

The porous ceramic material forming the walls 4 includes interconnected pores 16 (shown in FIG. 4) and the total porosity (% P) of this material is preferably between about 30%≤% P≤80%, by volume. It has been found that for ceramic filters according to embodiments of the invention having thin walls ($T_{wall}$<11.0 mils) (<279 μm) and relatively small median pore diameter (MPD), to maintain strength, the total porosity should desirably be less than about 60%. Additionally, to achieve low back pressure (ΔP, both clean and soot loaded), the total porosity (% P) may be made to be greater than 30%, greater than 35%, or even greater than 40%. In many suitable embodiments, the total porosity may be between 40% and 60% for such thin walled filters. Suitable median pore diameter (MPD) may be less than or equal to 28.0 μm, less than or equal to 20.0 μm, less than or equal to 18.0 μm, or even less than or equal to 15.0 μm, to ensure adequate wall strength and initial filtration efficiency (FE0). Preferably, the median pore diameter (MPD) may be between 4.0 μm≤MPD≤28.0 μm, or even 8.0 μm≤MPD≤28.0 μm, to ensure adequately low back pressure, such as clean pressure drop. Such a microstructure allows exhaust gases to freely flow through the walls forming the cells 9 so that entrained particulates may be filtered out at high initial filtration efficiency (FE0) of greater than or equal to 35%, and in some combinations greater than or equal to 40%, greater than or equal to 50%, or even greater than or equal to 60%. In some embodiments, initial filtration efficiency (FE0) of greater than or equal to 70%, greater than or equal to 80%, or even greater than or equal to 90%, are demonstrated.

In operation, the diesel particulate filter 1 is coupled such that the inlet end 5 of the filter 1 receives pressurized exhaust gases. As shown in FIGS. 1 and 2, these gases enter the ceramic body 3 through the plurality of gas inlet channels 6. The wall plugs 14 formed most downstream from the inlet end 5 of each of the cells 9 prevents these gasses from passing straight through the ceramic body 3. Instead, they are forced through the porous ceramic walls 4 of the inlet cell channels 9 and into adjacent outlet cell channels 8, where they are expelled out of the outlet end 7. The flow arrows at the upper end of FIG. 2 illustrate the roughly S-shaped flow path that diesel exhaust gases take through the gas channels 9 of the ceramic body 3.

Figure 4:
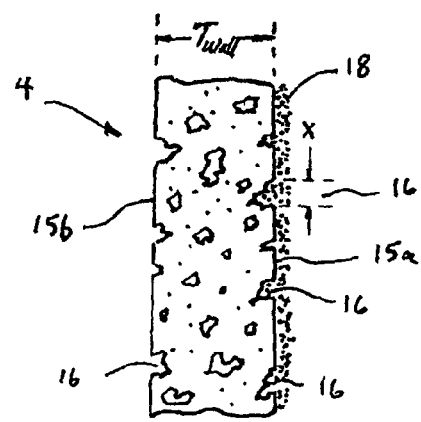
FIG. 4 is an enlarged view of the portion of the porous ceramic wall circled in phantom in FIG. 3.

With reference now to FIGS. 3 and 4, as exhaust gas flows into the gas inlet channels 6, the gas is forced through the cell walls 4 as indicated by the flow arrows in FIG. 3. Specifically, the exhaust gas first enters pores 16 of the microstructure present on the inner surfaces 15a of the cells 9 having open inlet channels 6, and then exits the pores 16 on the outer surfaces 15b. Entrained sash and soot particles in the exhaust gas form a layer 18 over the inner surfaces 15a, as shown.

The invention may best be understood with respect to FIG. 4. In contrast to prior art diesel particulate filters having a wall thickness ($T_{wall}$) of between 12 and 18 mils (305 μm to 457 μm), the wall thickness ($T_{wall}$) of the filter 1 of the invention is less than 11 mils (279 μm). To ensure adequate strength for filters including cordierite or aluminum titanate materials, the wall thickness ($T_{wall}$) may be 4.0 mils (102 μm) or more. In certain embodiments of particulate filters exhibiting good combinations of relatively high filtration efficiency (FE0) and relatively low back pressure (such as clean pressure drop), the wall thickness ($T_{wall}$) and median pore diameter (MPD) may be selected such that the WP ratio is greater than 10, wherein WP=($T_{wall}$/MPD). Additionally, the WP ratio ($T_{wall}$/MPD) may be less than 40, less than 35, less than 30, less than 25, or even less than 20, such that clean back pressure does not become too large.

For example, for a wall thickness ($T_{wall}$) range of 4 mils≤$T_{wall}$≤6 mils (102 μm–152 μm), WP should range such that 10<WP<30. Additionally, for a wall thickness ($T_{wall}$) range of 6 mils≤$T_{wall}$<9 mils (152 μm–229 μm), WP should range such that 12<WP<36. And for a wall thickness ($T_{wall}$) range of 9 mils≤$T_{wall}$<11 mils (228 μm–279 μm), WP should range such that 15<WP<42. $T_{wall}$ less than 4 mils (102 μm) may result in relatively poor strength. 102 μm≤$T_{wall}$<152 μm. In certain embodiments, ceramic wall-flow filters comprising $T_{wall}$<254 μm, $T_{wall}$<229 μm, or even $T_{wall}$<203 μm are provided.

Additionally, the total porosity (% P) of the ceramic walls 4 may be provided to be greater than 30%, greater than 35%, in the range of 30% to 80% by volume, or even 40% to 60%. The cell density of the cells 9 may be between 100 and 350 cpsi. However, in combination with such thin wall wall-flow filters, the inventors have recognized that a cell density (CD) between 150 and 300 cpsi generally provides overall relatively low pressure drop balancing the affects of clean back pressure drop and soot loaded pressure drop.

Finally, the strength of the walls 4, as measured by modulus of rupture (MOR), is preferably such that MOR≥150 psi, or even MOR≥250 psi when measured by a four point bend method on a 1"×½"×4½" honeycomb sample having various cell densities (CD) and wall thicknesses ($T_{wall}$). However, the strength is best characterized by the Normalized Strength Ratio (NSR) wherein NSR=MOR/CFAR, and whereas CFAR refers to the closed frontal area ratio, and is defined herein as:

$$CFA = T_{wall} CD \{(2/CD^{1/2}) - T_{wall}\}.$$

The pressure drop across the filter 1 can be calculated by the sum of the contributions arising from the exhaust gas entry into the inlets 6 of the cells 9 ($\Delta P_{entry}$), the passage of exhaust gas down the inlet cells 9 ($\Delta P_{inlet}$), the passage of gas through the soot or particulate layer 18 ($\Delta P_{particulate}$), the passage of exhaust gas through the ceramic walls 4 ($\Delta P_{wall}$), the passage of exhaust gas down the outlet cells 9 ($\Delta P_{outlet}$), and the expansion of the gas exiting the outlets 8 of the cells 9 ($\Delta P_{exit}$), according to the following expression:

$$\Delta P_{filter} = \Delta P_{entry} + \Delta P_{inlet} + \Delta P_{particulate} + \Delta P_{wall} + \Delta P_{outlet} + \Delta P_{exit}$$

The geometry of the filter 1, i.e. cell density (CD), wall thickness ($T_{wall}$), length of cells, and volume of the filter 1 affect the contributions from the individual pressure components listed above. Additionally, engine conditions such as exhaust gas flow rate, temperature, and rate of soot and ash accumulation affect the pressure drop and ultimately the selection of optimum filter design for the particular application.

As particles of both ash and soot accumulate to form the soot layer 18 on the inner surfaces 15a of the walls 4, an increase in the back pressure across the filter 1 arises thereby acting against the exhaust stream generated by the engine. This pressure increase is caused by the decreasing hydraulic cross sectional area of the cells 9 as the soot layer 18 accumulates on the ceramic walls 4 ($\Delta P_{inlet}$, $\Delta P_{entry}$), as well as by the increasing thickness of the soot layer 18 that the exhaust gas must travel through to exit the filter ($\Delta P_{particulate}$). The thin ceramic walls 4 of the inventive filter 1 decrease both of these pressure drop contributions by providing a larger hydraulic cross sectional area in the cells 9 for a given soot layer thickness, higher filtration area, and lower contribution from ($\Delta P_{wall}$). A mathematical model may be used for calculating the pressure drop as a function of web thickness and cell density given known inputs, such as the exhaust gas flow rate and temperature, filter diameter and length (volume), cell geometry, porosity and pore size distribution (permeability), and soot and/or ash load. This model may be applied to filters having different bulk densities as a result of different porosities of the walls 4, as well as both conditioned (with some soot loading) and unconditioned (clean) filters. The model assumes: filtration of the exhaust gasses from both particle-filled pores 16 and from the soot layer 18 that accumulates over the ceramic walls 4 (otherwise known as deep bed and cake filtration); the presence of a soot layer 18 on both the walls 4 and the outlet wall plugs 14a, and a soot particle diameter of 80-120 nm, ash particle diameter of 1 μm, soot deposit density of 150 kg/m3, ash deposit density of 300-400 kg/m3, density of ash and soot particles as 2000 kg/m3.

Through modeling, it is possible to calculate the volume of filter needed to maintain a particular pressure drop as a function of soot load if the other parameters listed above are kept constant. This is helpful if the goal of the geometry change is to minimize filter volume. Reduction of filter volume is a desired feature, especially for retrofit applications.

Figure 5:
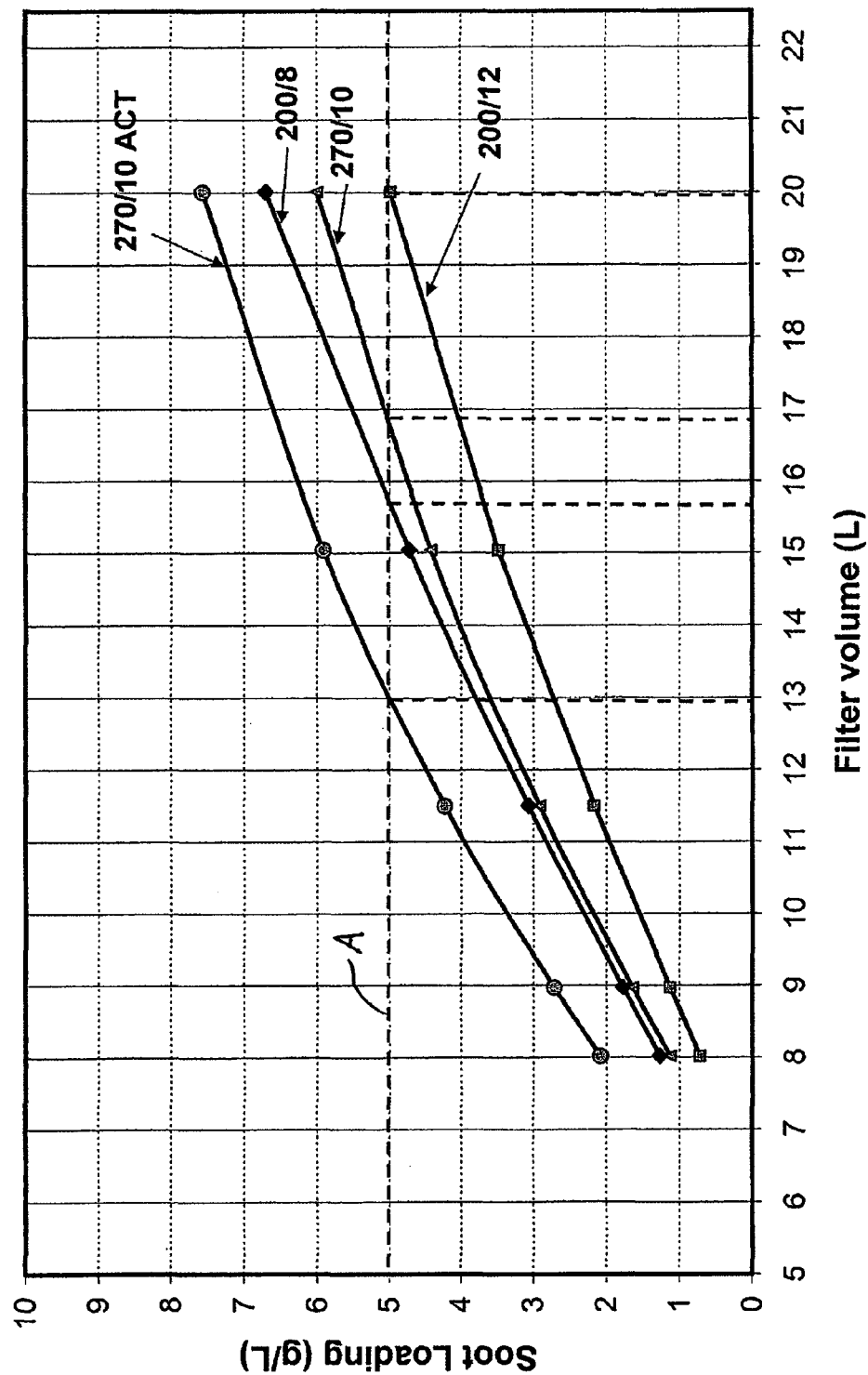
FIG. 5 is a graph illustrating the filter volume (in Liters) required to maintain a constant pressure drop as a function of soot loading (in g/L) for filters having different cell densities and wall thicknesses.

The results of certain modeling calculations are shown in FIG. 5 for a constant pressure drop of 25 kPa for four different filters 1 having cell densities and wall thicknesses of:

(a) 200 cpsi, 12.0 mils, and MPD=17 μm (comparative 200/12 filter);
 (b) 200 cpsi, 8 mils, and MPD=17 μm (200/8),
 (c) 270 cpsi, 10 mils, and MPD=17 μm (270/10), and
 (d) 270 cpsi, 10 mils, and MPD=17 μm with larger inlets than outlets (270/10 ACT), respectively. The examples include, respectively, WP ratios of (a) 17.9, (b) 12.0, (c) 14.9, and (d) 14.9. The modeled conditions further include size of 10.5 inches diameter, Q=24.2 kg/min wherein Q is the loss flow rate of gas, gas temperature of 450° C. within the filter, total ash level in the filter of 360 grams, and a ash loaded target back pressure of 25 kPa. As shown in FIG. 5, the advantage of certain thinner ceramic walls 4 in examples b-d is demonstrated. For example, for any particular desired back pressure level, moving to thinner wall thickness ($T_{wall}$) while maintaining the WP ratio at $T_{wall}$/MPD>10 allows the same backpressure in a significantly smaller filter volume (measured in liters (L)).

For example, at 5 g/L soot loading (dotted line labeled A), the present invention thin-walled filter having a WP ratio of $T_{wall}$/MPD>10 in a 200/8 configuration may be housed in approximately 22% less volume as compared to a prior art 200/12 configuration. Additionally, these plots also show the advantage of combining certain unequal inlet and outlet cell areas (labeled as ACT) with thin-walled filter fulfilling the aforementioned WP ratio of $T_{wall}$/MPD>10. As can be seen from FIG. 5, at any particular soot loading (see horizontal dotted line labeled A) examples having thin ceramic walls 4 (less than 11 mils) fulfilling the aforementioned WP ratio of $T_{wall}$/MPD>10 and also having area ratios Ai/Ao of the inlet area (Ai) to outlet area (Ao) of 1.2 or more allow additional significant reduction (as much as 23% lower) in filter volume at the same back pressure level as compared to a like configuration (e.g., 270/10) with equal sized inlet and outlets. The comparisons are made on filters having cordierite materials, such as described in U.S. Pat. No. Re 38,888, for example.

FIGS. 7A and 7B illustrate cross sectional views of half-sections of filters 1 having an cell designs with standard equal sized inlets and outlets (FIG. 7A), and an ACT cell design with larger inlet channels than outlet channels (FIG. 7B) and wherein the wall plugs 14 have been eliminated so that the differences in the cells sizes may be more readily seen. In FIG. 7A, the honeycomb body structure of intersecting walls is shown wherein the inlet cells and outlet cells are, on average, of substantially the same cross sectional area. Here, in FIG. 7B, the inlet cells channels 19 are larger in cross sectional area, on average, than the outlet cell channels 20. Accordingly, the average hydraulic diameter (Dhi) of the inlet cell channels 19 (defined by Dhi=4Ai/Pi, where Ai is the average inlet cross sectional area of the inlet cells and Pi is the average perimeter around the inlet cell in that cross section) is greater than the average hydraulic diameter (Dho) of the outlet channels 20 (defined by Dho=4Ao/Po, where Ao is the average inlet cross sectional area of the outlet cells and Pi is the average perimeter around the outlet cell in that cross section). In particular, for thin-walled applications, the hydraulic diameter of the inlet channels (Dhi) is larger than that of the hydraulic diameter (Dho) of the outlet cells 20 such that the hydraulic diameter ratio, defined herein as Dh=(Dhi/Dho), is Dh>1.2. Additionally, the ratio Dh may be such that Dh<1.6. As can be seen, the 270/10 ACT design (graph d) in FIG. 5 meets the 25 kPa pressure drop requirement in the least amount of filter volume (<11 L).

FIG. 6 shows of these modeling calculations for constant pressure drop of 30 kPa, gas flow Q of 24.2 kg/min, gas temperature of 450° C., ash load of 360 g at 300 g/L, max filter volume of 20 liters, and filter diameter of 10.5 inches (267 mm), for various different inventive and comparative example filters 1 having various combinations of cell densities (CD) and wall thicknesses and all having 17.0 µm median pore diameter. Examples include:

(a) 200 cpsi and 18.0 mils (200/18 filter for comparative purposes);
(b) 200 cpsi and 12.0 mils (200/12 filter for comparative purposes);
(c) 270 cpsi and 15.0 mils with ACT (270/15 ACT for comparative purposes);
(d) 200 cpsi and 12.0 mils with ACT (200/12 ACT for comparative purposes);
(e) 300 cpsi and 12.0 mils with ACT (300/12 ACT for comparative purposes);
(f) 200 cpsi and 9.0 mils with ACT (200/9 ACT inventive example);
(g) 300 cpsi and 10.0 mils with ACT (300/10 ACT inventive example); and
(h) 300 cpsi and 8.0 mils with ACT (300/8 ACT inventive example), respectively.

As is demonstrated by the modeled data, the inventive examples of 200/9 ACT, 300/8 ACT and 100/10 ACT configurations in FIG. 6 meet the pressure drop requirements (30 kPa) in the least amount of volume as compared to the comparative configurations: 200/18, 200/12, 270/15 ACT, 200/12 ACT, and 300/12 ACT. Following line labeled B along, it should be recognized that by comparison of a 200/12 configuration of the prior art with a 300/8 ACT inventive configuration lowers the overall length of the filter from about 13.6 inches (345 mm) to about 7.4 inches (188 mm), a remarkable approximately 45% reduction in length.

Figure 9:
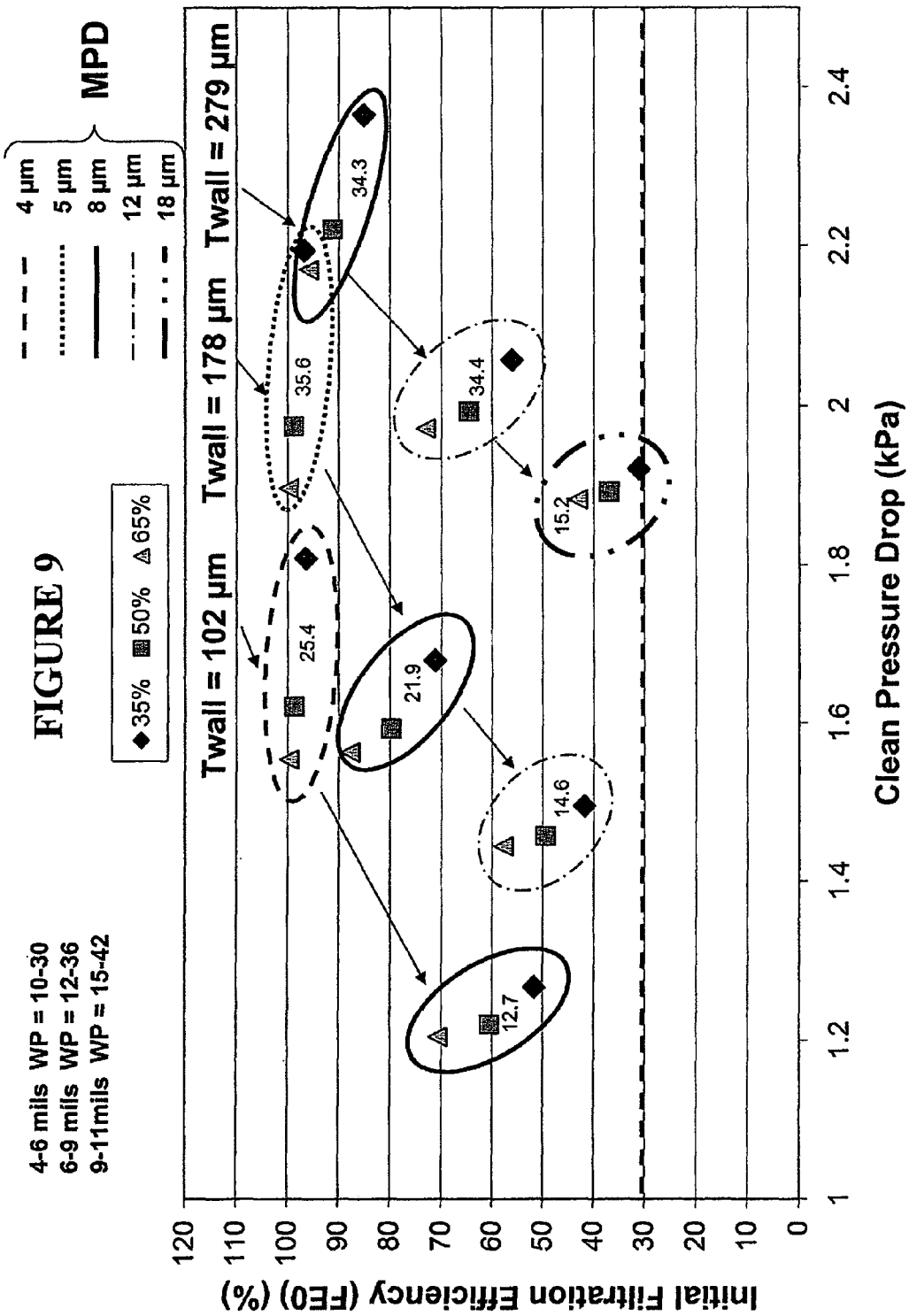
FIG. 9 is a graph illustrating filter clean pressure drop (in kPa) versus initial filtration efficiency (FE0–in %) for various combinations of wall thickness and median pore diameter of the invention.

In developing the present invention, the applicants initially believed that the use of a ceramic walls 4 having a thickness of less than 12.0 mils (305 µm) could potentially result in the disadvantages of a lowered filtration efficiency, lowered bulk heat capacity (placing a limitation of soot mass limit), and lowered strength. However, the inventors have discovered that good initial filtration efficiency (FE0), above 30%, can be maintained with a wall thickness ($T_{wall}$) less than 11.0 mils (<279 µm) as long as the wall thickness ($T_{wall}$) is more than an order of magnitude (×10) larger than the median pore diameter (MPD). Therefore, in accordance with a broad aspect of the invention, the inventive filter exhibits a WP ratio of $T_{wall}$/MPD>10, >12, or even >15, wherein both $T_{wall}$ and MPD are in Jim. The pore microstructure structure should also not be too fine, or the pressure drop may increase to an unacceptable level. Consequently, the WP ratio of $T_{wall}$/MPD should not exceed a value of about 42 in order to maintain relatively low clean pressure drop. Additionally, for certain wall thicknesses, the WP ratio should be <40, <30, <35, <30, or even <20. Bulk heat capacity can be an important feature in applications where high levels of soot are accumulated in between active regeneration cycles. In cases where bulk heat capacity is an important design feature, lower levels of total porosity (% P) may be used to compensate for thinner webs to maintain a relatively high bulk density. For example, total porosities (% P) of less than or equal to 50% may be utilized in these cases in accordance with embodiments of the invention. Graph in FIG. 9 best illustrates the benefits of the present invention in terms of achieving both relatively high initial filtration efficiency as well as relatively low clean pressure drop. In particular, >30% initial filtration efficiency (FE0) is achieved by the combinations of thin walls and controlled MPD such that WP ratio is maintained WP>10. The various circled embodiments illustrate MPD of 4 mil-8 mils, respectively, whereas, wall thickness ($T_{wall}$) of between 4 mil (102 µm) and 11 mil (279 µm) are shown. The values within the circles are the WP ratio for the various example embodiments. The positive impact on pressure drop for thin ceramic walls 4 with reduced mean pore diameter (MPD) can also be seen in the experimental results tabulated below in Table 1. Reported in Table 1 are clean pressure drop (ΔPc) in psi, soot loaded pressure drop (ΔPs) in psi, total porosity (% P) in %, $T_{wall}$ in mils (microns in parenthesis), cell density (CD) in cpsi, mean pore diameter (MPD) in Jim, WP ratio, cellular Modulus of Rupture (MOR) in psi, the closed frontal area ratio (CFAR), and the normalized strength (NS) in psi.

TABLE 1

Experimental Examples

| Ex. # | ΔPc (psi) | ΔPs (psi) | % P (%) | MPD (µm) | CD (cpsi) | $T_{wall}$ (mil) | WP | MOR (psi) | CFAR | NS (psi) | Bulk Density (g/L) |
|---|---|---|---|---|---|---|---|---|---|---|---|
| C1 | 2.1 | 5.7 | 51 | 19.0 | 270 | 17.2 (437) | 23.0 | 503 | 0.485 | 1037 | 0.60 |
| C2 | 1.7 | 5.0 | 51 | 19.0 | 279 | 13.0 (330) | 17.4 | 317 | 0.387 | 819 | 0.48 |
| I1 | 1.2 | 4.4 | 44 | 15.5 | 268 | 10.5 (267) | 17.2 | 319 | 0.314 | 1015 | 0.45 |
| I2 | 1.3 | 5.8 | 41 | 18.0 | 274 | 9.6 (244) | 13.5 | 352 | 0.293 | 1201 | 0.43 |
| I3 | 1.3 | 3.9 | 48 | 15.5 | 281 | 9.3 (236) | 15.2 | 300 | 0.287 | 1045 | 0.38 |
| I4 | 1.0 | 3.3 | 53 | 25.0 | 270 | 10.2 (259) | 10.4 | 330 | 0.307 | 1075 | 0.36 |
| I5 | 1.2 | 3.9 | 44 | 18.0 | 276 | 9.7 (246) | 13.7 | 301 | 0.296 | 1017 | 0.42 |
| I6 | 0.8 | 2.6 | 56 | 14.0 | 203 | 9.2 (234) | 16.7 | 543 | 0.245 | 2216 | 0.27 |

TABLE 1-continued

Experimental Examples

| Ex. # | ΔPc (psi) | ΔPs (psi) | % P (%) | MPD (μm) | CD (cpsi) | $T_{wall}$ (mil) | WP | MOR (psi) | CFAR | NS (psi) | Bulk Density (g/L) |
|---|---|---|---|---|---|---|---|---|---|---|---|
| I7 | 1.0 | 3.0 | 55 | 12.0 | 202 | 8.5 (216) | 18.0 | 510 | 0.227 | 2246 | 0.26 |

TABLE 2

Modeled Examples

| % P (%) | MPD (μm) | $T_{wall}$ (mils) | WP = Twall/ MPD | FE0 (%) | dP clean (kPa) | dP 5 g/L (kPa) |
|---|---|---|---|---|---|---|
| 35 | 4 | 4 | 25.40 | 96.435 | 1.808 | 5.069 |
| 35 | 5 | 7 | 35.56 | 96.820 | 2.194 | 5.810 |
| 35 | 8 | 4 | 12.70 | 51.707 | 1.267 | 4.506 |
| 35 | 8 | 7 | 22.23 | 71.230 | 1.679 | 5.273 |
| 35 | 8 | 11 | 34.93 | 85.044 | 2.365 | 6.538 |
| 35 | 12 | 7 | 14.82 | 41.765 | 1.495 | 5.081 |
| 35 | 12 | 11 | 23.28 | 56.068 | 2.057 | 6.214 |
| 35 | 18 | 11 | 15.52 | 31.124 | 1.920 | 6.071 |
| 50 | 4 | 4 | 25.40 | 98.670 | 1.621 | 4.874 |
| 50 | 5 | 7 | 35.56 | 98.820 | 1.974 | 5.581 |
| 50 | 8 | 4 | 12.70 | 60.524 | 1.220 | 4.458 |
| 50 | 8 | 7 | 22.23 | 79.700 | 1.593 | 5.183 |
| 50 | 8 | 11 | 34.93 | 91.190 | 2.221 | 6.387 |
| 50 | 12 | 7 | 14.82 | 49.430 | 1.457 | 5.042 |
| 50 | 12 | 11 | 23.28 | 64.580 | 1.993 | 6.147 |
| 50 | 18 | 11 | 15.52 | 36.947 | 1.892 | 6.041 |
| 65 | 4 | 4 | 25.40 | 99.725 | 1.554 | 4.805 |
| 65 | 5 | 7 | 35.56 | 99.749 | 1.896 | 5.500 |
| 65 | 8 | 4 | 12.70 | 70.718 | 1.204 | 4.441 |
| 65 | 8 | 7 | 22.23 | 87.718 | 1.563 | 5.152 |
| 65 | 8 | 11 | 34.93 | 95.886 | 2.17 | 6.333 |
| 65 | 12 | 7 | 14.82 | 57.760 | 1.444 | 5.027 |
| 65 | 12 | 11 | 23.28 | 73.156 | 1.971 | 6.124 |
| 65 | 18 | 11 | 15.52 | 43.113 | 1.882 | 6.030 |

Additionally, and in another broad aspect of the invention, high strength is provided to meet strength requirements to for handling, catalyst application, and canning. The inventors have observed the strength given by Modulus of Rupture (MOR) in the axial direction should be MOR≥150 psi, and in some embodiments MOR≥250 psi when measured on a four point bend test and on a 1" by ½" by 4½ cellular sample of the cell structure described. A normalized strength (NS) may be used to characterize the strength for any particular cell structure. The normalized strength (NS) is NS=MOR/CFA, where CFA is the closed frontal area ratio and is given by:

$$CFAR=CD*W*((1/CD^{1/2})-W).$$

It can be seen in Table 1 that inventive bodies all exceed values of MOR/CFA.

Different modifications, additions, and variations of this invention will be evident to the persons of ordinary skill in the art. All such variations, additions, and modifications are encompassed within the scope of this invention, which is limited only by the appended claims, and the equivalents thereto.

What is claimed is:

1. A ceramic wall-flow filter, comprising:
   a plurality of porous ceramic walls forming cell channels, at least some of the cell channels including plugs, wherein the porous ceramic walls exhibit 102 μm≤$T_{wall}$<279 μm, and 15<WP<42 wherein WP is a ratio defined as WP=$T_{wall}$/MPD, MPD is a median pore diameter of a porosity in the walls in μm, and $T_{wall}$ is a wall thickness of the walls in μm;
   wherein the ceramic wall-flow filter employs asymmetric cell technology (ACT); and
   wherein the configuration (cell density (cpsi)/wall thickness (mils)) of the ceramic wall-flow filter is selected from the group consisting of: 200/9 ACT, 270/10 ACT, 270/15 ACT, 300/8 ACT, 300/10 ACT, 300/12 ACT, and 100/10 ACT.

2. The ceramic wall-flow filter of claim 1 having a reduced volume compared to a non-ACT filter of the same configuration.

3. The ceramic wall-flow filter of claim 2, wherein the volume reduction is up to 23%.

4. The ceramic wall-flow filter of claim 2 wherein the configuration is 270/10 ACT and wherein the ceramic wall-flow filter has a volume of less than 11 L.

5. The ceramic wall-flow filter of claim 1, wherein an average cross sectional area of inlets of said cell channels (Ai) are larger than an average cross sectional area of outlets of the cell channels (Ao).

6. The ceramic wall-flow filter of claim 5, further comprising: an average inlet hydraulic diameter to outlet hydraulic diameter ratio (Dh) wherein Dh>1.2, and
   Dh=Dhi/Dho,
   Dhi=4Ai/Pi, and
   Dho=4Ao/Po
   wherein Dhi is the average inlet hydraulic diameter, Dho is the average outlet hydraulic diameter, Ai is the average inlet cross sectional area, Ao is the average outlet cross sectional area, Pi is the average perimeter around the inlet cells, and Po is the average perimeter around the outlet cells.

7. The ceramic wall-flow filter of claim 6, further comprising: 1.2<Dh<1.6.

8. The ceramic wall-flow filter of claim 1, wherein the walls further comprise a Normalized Strength (NS) of NS≥1000 psi defined as NS=MOR/CFAR wherein MOR is a modulus of rupture strength measured in psi on a four point bending test on a 1"×½"×4½" cellular sample, and CFAR is a closed frontal area ratio defined as CFAR=$T_{wall}$ CD {(2/CD$^{1/2}$)−$T_{wall}$} wherein CD is the cell density (CD) in cells/in$^2$.

9. The ceramic wall-flow filter of claim 1, further comprising a total porosity (%P) of the walls wherein 30%≤%P≤80%, by volume.

10. A ceramic diesel particulate wall-flow filter, comprising:
    a plurality of porous ceramic walls defining cell channels, at least some of the channels being plugged, the filter exhibiting 178 μm≤$T_{wall}$≤279 μm, 4.0 μm≤MPD≤18.0 μm, $35\% \leq \%P \leq 75\%$, $15 < (T_{wall}/MPD) < 35$, $Ai/Ao > 1.2$, and $150 \text{ cpsi} \leq CD \leq 300 \text{ cpsi}$ wherein $T_{wall}$ is is a thickness of the walls in μm, MPD is a median pore diameter of the pores in the walls in μm, %P is a total porosity of the walls by volume, Ai is a cross sectional area of the inlets cells, Ao is a cross sectional area of the outlet cells (Ao), and CD is the cell density in cpsi; and wherein the ceramic wall-flow filter employs asymmetric cell technology (ACT); and wherein the configuration (cell density (cpsi)/wall thickness (mils)) of the ceramic wall-flow filter is selected from the group consisting of: 200/9 ACT, 270/10 ACT, 270/15 ACT, 300/8 ACT, 300/10 ACT, 300/12 ACT, and 100/10 ACT.

11. The ceramic wall-flow filter of claim 4, wherein the filter has a pressure drop of 25 kPa.

* * * * *